US012701593B2

(12) United States Patent
Gupta et al.

(10) Patent No.: US 12,701,593 B2
(45) Date of Patent: Aug. 4, 2026

(54) ADAPTIVE DISTRIBUTED UNIT (DU) SCHEDULER

(71) Applicant: DISH WIRELESS L.L.C., Englewood, CO (US)

(72) Inventors: Sourabh Gupta, Ashburn, VA (US); Gurpreet Sohi, Parker, CO (US); Dhaval Mehta, Aldie, VA (US)

(73) Assignee: DISH Wireless L.L.C., Englewood, CO (US)

( * ) Notice: Subject to any disclaimer, the term of this patent is extended or adjusted under 35 U.S.C. 154(b) by 353 days.

(21) Appl. No.: 18/229,125

(22) Filed: Aug. 1, 2023

(65) Prior Publication Data

US 2024/0334423 A1 Oct. 3, 2024

Related U.S. Application Data

(60) Provisional application No. 63/492,680, filed on Mar. 28, 2023.

(51) Int. Cl.
*H04W 72/12* (2023.01)
*H04W 24/02* (2009.01)
(Continued)

(52) U.S. Cl.
CPC ........... *H04W 72/52* (2023.01); *H04W 24/02* (2013.01); *H04W 28/16* (2013.01); *H04W 72/12* (2013.01);
(Continued)

(58) Field of Classification Search
None
See application file for complete search history.

(56) References Cited

U.S. PATENT DOCUMENTS

2017/0339706 A1 11/2017 Andreoli-Fang et al.
2018/0124800 A1* 5/2018 Arnold ................ H04W 72/542
(Continued)

FOREIGN PATENT DOCUMENTS

EP 3869847 A1 8/2021
WO WO-2023283102 A1 * 1/2023 ............ H04W 24/08

OTHER PUBLICATIONS

Balasubramanian, B., et al., "RIC: A RAN Intelligent Controller Platform for AI-Enabled Cellular Networks", IEEE Internet Computing, vol. 25, No. 2, Mar. 11, 2021, pp. 7-17.
(Continued)

*Primary Examiner* — Kodzovi Acolatse
(74) *Attorney, Agent, or Firm* — Jeremiah J. Baunach; Frontier IP Law PLLC

(57) ABSTRACT

Embodiments are directed towards an adaptive DU scheduler that increases the user experiences on higher channel bandwidths (BWs) while ensuring no drops for Voice over New Radio (VoNR) or other high priority traffic. Example embodiments include systems and methods for an adaptive distributed unit (DU) scheduler in a wireless telecommunication network, such as a wireless 5G network. Example embodiments include systems and methods that include: a central scheduler for maximizing overall throughput based on received parameter values; maximizing the overall cell site throughput; an intelligence layer that has an artificial intelligence and/or machine learning (AI/ML) model that increases the performance for all the cells by sending info to central scheduler for each of the cells; an intelligence layer that has an AI/ML models for each site type based on the traffic distribution across each cell; centralized RAN pooling; a containerized DU server with master a controller pod controlling individual cell pods; and a containerized DU server with a DU common scheduler managing all the cells.

17 Claims, 20 Drawing Sheets

(51) Int. Cl.

| | |
|---|---|
| *H04W 28/16* | (2009.01) |
| *H04W 72/1263* | (2023.01) |
| *H04W 72/52* | (2023.01) |
| *H04W 72/542* | (2023.01) |
| *H04W 72/56* | (2023.01) |
| *H04W 72/566* | (2023.01) |

(52) U.S. Cl.
CPC ..... *H04W 72/1263* (2013.01); *H04W 72/542* (2023.01); *H04W 72/56* (2023.01); *H04W 72/566* (2023.01); *H04W 72/569* (2023.01)

(56) References Cited

U.S. PATENT DOCUMENTS

| | | | | |
|---|---|---|---|---|
| 2018/0285383 | A1* | 10/2018 | Nara | H04L 69/04 |
| 2022/0210794 | A1 | 6/2022 | Pietrzyk et al. | |
| 2022/0278926 | A1* | 9/2022 | Sharma | H04L 45/586 |
| 2022/0377751 | A1 | 11/2022 | Kotaru et al. | |
| 2023/0079209 | A1* | 3/2023 | Nallamothu | H04L 12/4641 |
| | | | | 709/238 |
| 2023/0189077 | A1 | 6/2023 | Kwon et al. | |
| 2023/0195489 | A1* | 6/2023 | Lan | H04W 84/02 |
| | | | | 718/1 |
| 2023/0336440 | A1* | 10/2023 | Trujillo | H04L 41/40 |
| 2023/0337047 | A1* | 10/2023 | Mehta | H04W 28/0268 |
| 2024/0007921 | A1* | 1/2024 | Seo | H04L 43/20 |
| 2024/0040506 | A1 | 2/2024 | Uziel et al. | |
| 2024/0154682 | A1 | 5/2024 | Bai et al. | |
| 2024/0305533 | A1* | 9/2024 | Bai | H04W 24/02 |
| 2024/0334463 | A1 | 10/2024 | Gupta et al. | |
| 2024/0334473 | A1 | 10/2024 | Gupta et al. | |
| 2025/0097732 | A1 | 3/2025 | Hegde | |

OTHER PUBLICATIONS

International Search Report and Written Opinion received for PCT Patent Application No. PCT/US24/19776, mailed on Jul. 25, 2024, 15 pages.

Sourabh Gupta et al., "Adaptive Distributed Unit (DU) Scheduler," U.S. Appl. No. 18/229,121, filed Aug. 1, 2023. (48 Pages).

Sourabh Gupta et al., "Adaptive Distributed Unit (DU) Scheduler," U.S. Appl. No. 18/229,123, filed Aug. 1, 2023. (50 Pages).

Sourabh Gupta et al., "Adaptive Distributed Unit (DU) Scheduler," U.S. Appl. No. 18/229,124, filed Aug. 1, 2023. (48 Pages).

* cited by examiner

100

(Embodiment 1)

Central scheduler of a DU receiving, via each respective pod of a plurality of respective pods, cell parameter values
252

Central scheduler managing the radio resources based on the received parameter values
254

(Embodiment 2)

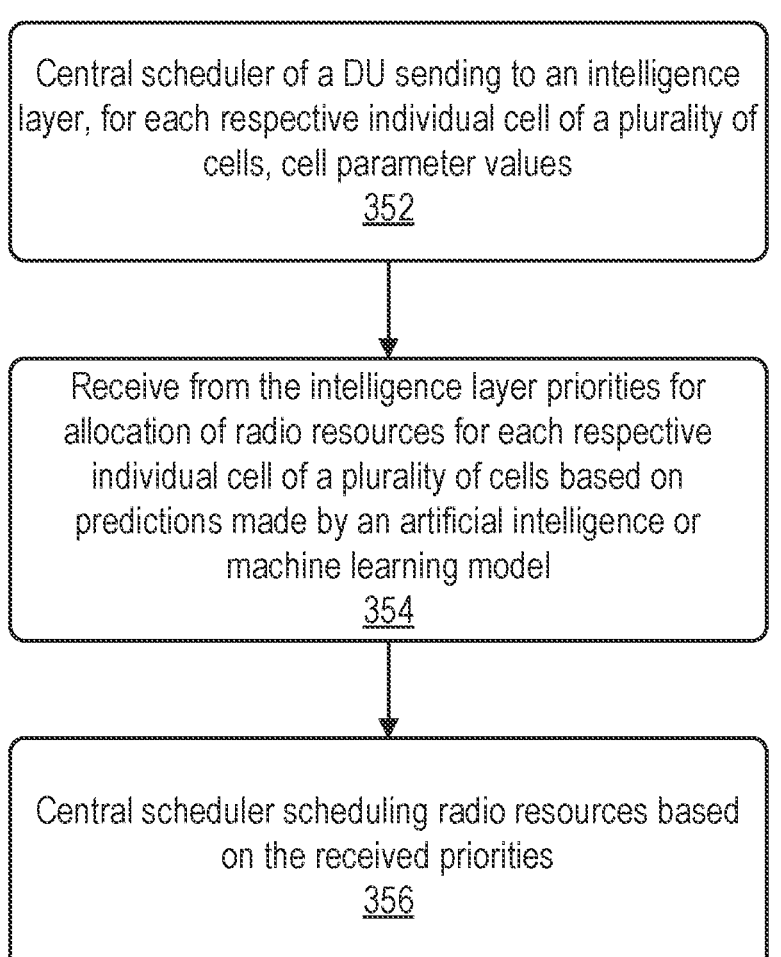

Central scheduler of a DU sending to an intelligence layer, for each respective individual cell of a plurality of cells, cell parameter values
352

Receive from the intelligence layer priorities for allocation of radio resources for each respective individual cell of a plurality of cells based on predictions made by an artificial intelligence or machine learning model
354

Central scheduler scheduling radio resources based on the received priorities
356

FIG. 3B (Embodiment 3)

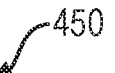

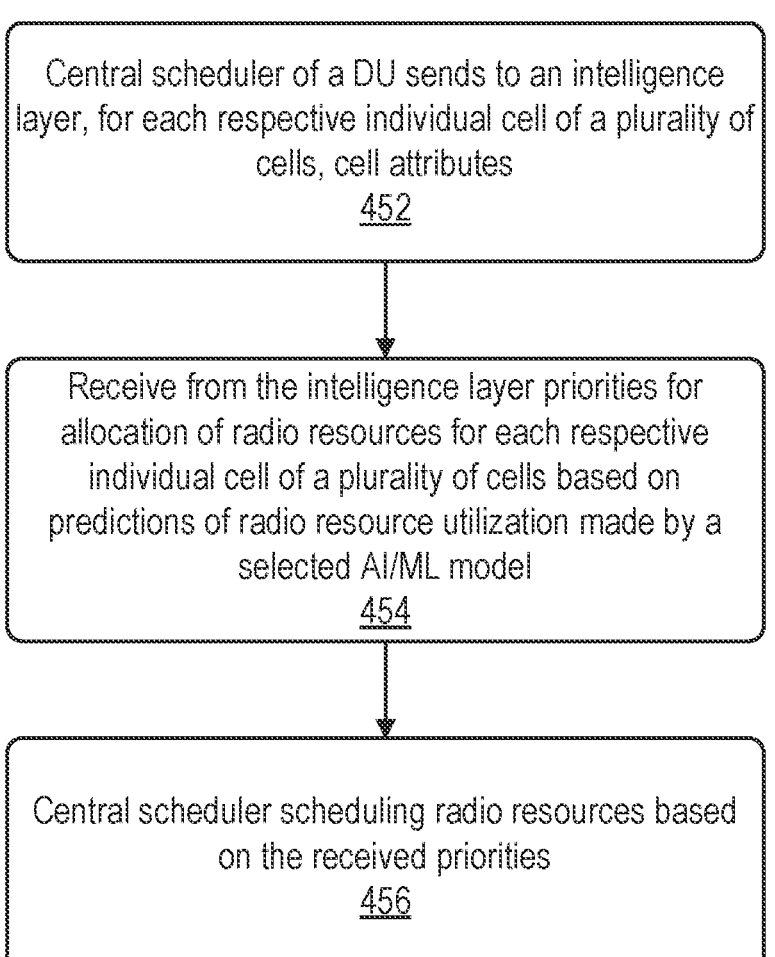

Central scheduler of a DU sends to an intelligence layer, for each respective individual cell of a plurality of cells, cell attributes
452

Receive from the intelligence layer priorities for allocation of radio resources for each respective individual cell of a plurality of cells based on predictions of radio resource utilization made by a selected AI/ML model
454

Central scheduler scheduling radio resources based on the received priorities
456

FIG. 4B

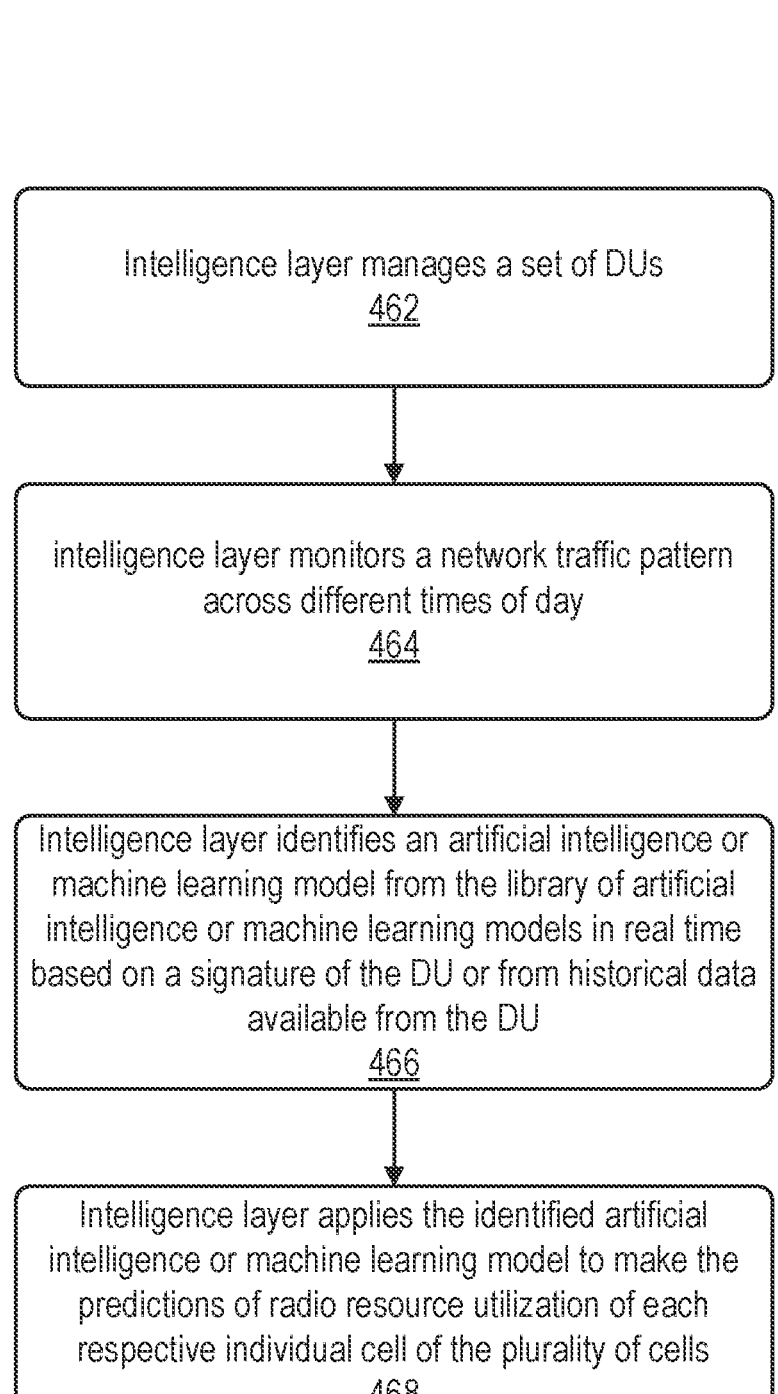

460

Intelligence layer manages a set of DUs
462 intelligence layer monitors a network traffic pattern across different times of day
464

Intelligence layer identifies an artificial intelligence or machine learning model from the library of artificial intelligence or machine learning models in real time based on a signature of the DU or from historical data available from the DU
466

Intelligence layer applies the identified artificial intelligence or machine learning model to make the predictions of radio resource utilization of each respective individual cell of the plurality of cells
468

FIG. 4C (Embodiment 4)

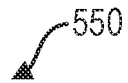

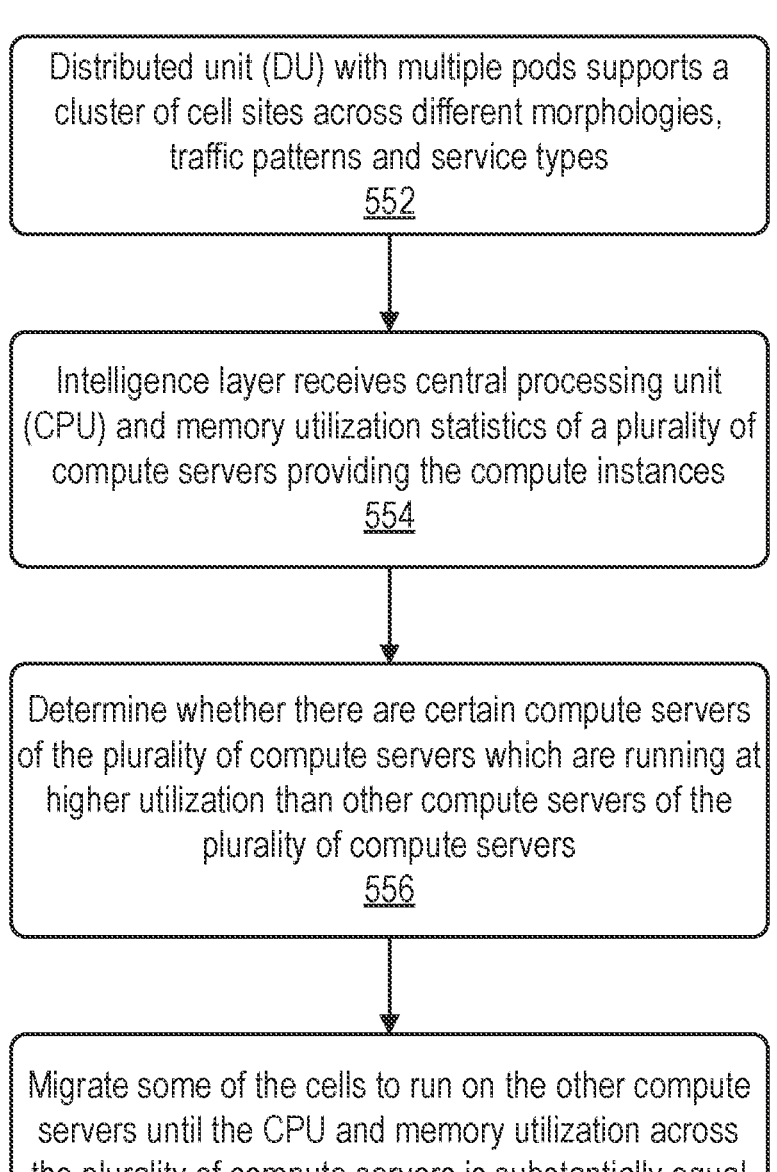

Distributed unit (DU) with multiple pods supports a cluster of cell sites across different morphologies, traffic patterns and service types
552

Intelligence layer receives central processing unit (CPU) and memory utilization statistics of a plurality of compute servers providing the compute instances
554

Determine whether there are certain compute servers of the plurality of compute servers which are running at higher utilization than other compute servers of the plurality of compute servers
556

Migrate some of the cells to run on the other compute servers until the CPU and memory utilization across the plurality of compute servers is substantially equal
558

FIG. 5B

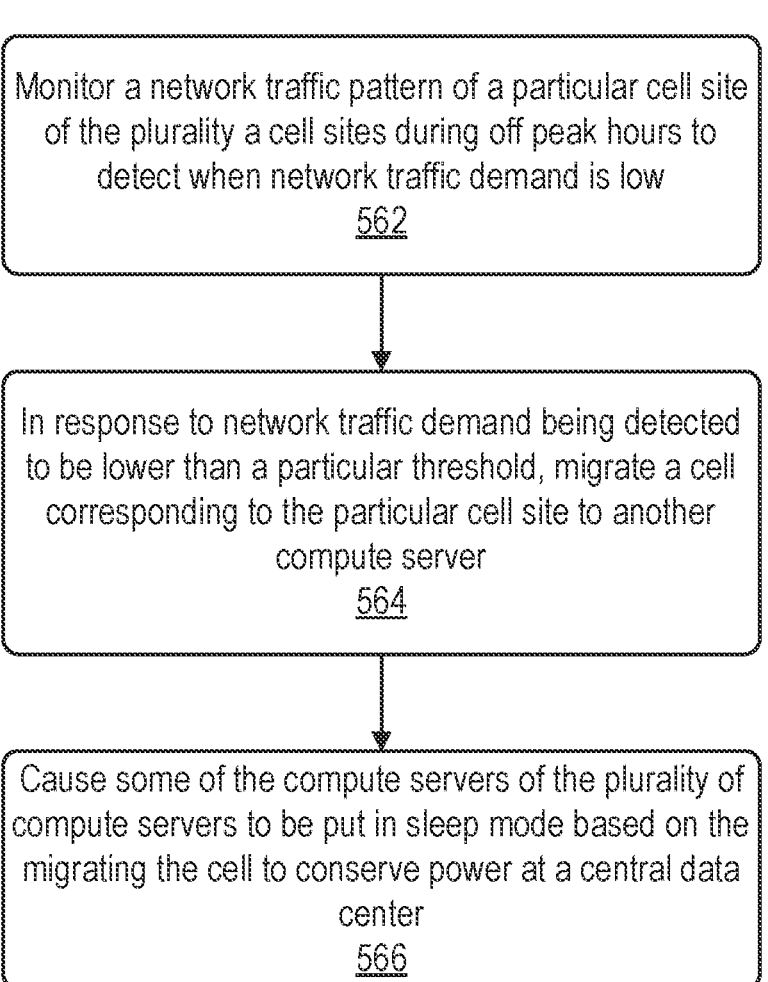

Monitor a network traffic pattern of a particular cell site of the plurality a cell sites during off peak hours to detect when network traffic demand is low
562

In response to network traffic demand being detected to be lower than a particular threshold, migrate a cell corresponding to the particular cell site to another compute server
564

Cause some of the compute servers of the plurality of compute servers to be put in sleep mode based on the migrating the cell to conserve power at a central data center
566

FIG. 5C

Master controller pod receives, via each respective pod of the plurality of respective pods, cell parameter values
762

Master controller pod manages the radio resources based on the received parameter values
764

850

DU pod that is a common scheduler pod manages
resources for a DU
852

Common scheduler pod supports scheduling of radio
resources for each respective individual cell of a
plurality of cells which the DU serves
854

Host Computer System(s)
901

Memory
902

Control Module
904

Other Programs and Data
910

| CPU 914 | I/O Interfaces 918 | Other Computer Readable Media 920 | Network Connections 922 |
|---|---|---|---|

ADAPTIVE DISTRIBUTED UNIT (DU) SCHEDULER

TECHNICAL FIELD

The present disclosure relates generally to cellular telecommunication networks and, more particularly, to scheduling of radio resources by distributed units (DUs) of cellular telecommunication networks.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. However, the scheduling of radio resources in such networks traditionally does not consider maximizing the user experiences on higher channel bandwidths (BWs) while ensuring no drops for Voice over New Radio (VoNR) or other high priority traffic. Thus, maximizing such user experiences is important to providing increased network performance and reliability. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtual RAN with interfaces creating additional data access points.

5G network functions may be completely software-based and designed as cloud-native, meaning that they're agnostic to the underlying cloud infrastructure, allowing higher deployment, agility and flexibility.

With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021 December). Each network function (NF) is formed by a combination of small pieces of software code called as microservices.

Embodiments described herein may use containerization to implement such microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions.

A cluster is made up of nodes that run containerized applications. Each cluster also has a master (control plane) that manages the nodes and pods of the cluster. A node represents a single machine in a cluster, typically either a physical machine or virtual machine that's located either on-premises or hosted by a cloud service provider. Each node hosts groups of one or more containers (which run applications), and the master communicates with nodes about when to create or destroy containers and how to re-route traffic based on new container alignments. The Kubernetes master is the access point (or the control plane) from which administrators and other users interact with the cluster to manage the scheduling and deployment of containers.

A pod is the basic unit of scheduling for applications running on a cluster. The applications are running in containers, and each pod comprises one or more container(s). While pods are able to house multiple containers, onecontainer-per-pod may also be used. In some situations, containers that are tightly coupled and need to share resources may sit in the same pod. Pods can quickly and easily communicate with one another as if they were running on the same machine. They do still, however, maintain a degree of isolation. Each pod is assigned a unique IP address within the cluster, allowing the application to use ports without conflict.

Pods are designed as relatively ephemeral, disposable entities. When a pod gets created, it is scheduled to run on a node. The pod remains on that node until the process is terminated, the pod object is deleted, the pod is evicted for lack of resources, or the node fails. In Kubernetes, pods are the unit of replication. If an application becomes overly popular and a pod can no longer facilitate the load, Kubernetes can deploy replicas of the pod to the cluster.

Software container orchestration platforms, such as Amazon Elastic Kubernetes Service (Amazon EKS) or other Kubernetes services EKS platforms, are services for users to run Kubernetes on the cloud of a cloud computing service provider, such as Amazon Web Services (AWS) or other private or public cloud platforms, without the user needing to install, operate, and maintain their own Kubernetes control plane or nodes. An Amazon EKS cluster comprises of two primary components: the Amazon EKS control plane and Amazon EKS nodes that are registered with the control plane. The Amazon EKS control plane comprises of control plane nodes that run the Kubernetes software and the Kubernetes application programming interface (API) server. The control plane may run in an account managed by AWS or the telecommunication service provider, and the Kubernetes API is exposed via the Amazon EKS endpoint associated with the cluster. Each Amazon EKS cluster control plane is single-tenant and unique, and runs on its own set of Amazon EC2 instances. The cluster control plane may be provisioned across multiple Availability Zones (AZs) and fronted by an Elastic Load Balancing Network Load Balancer. Amazon EKS may also provision elastic network interfaces in VPC subnets to provide connectivity from the control plane instances to the nodes. Amazon EKS nodes may run in an AWS account of the telecommunication service provider and connects to the telecommunication service provider's cluster control plane via the API server endpoint and a certificate file that is created for the cluster. Other Kubernetes services and other software containerization programming languages, platforms and services may also or instead be used in various different embodiments.

As disclosed herein, a DU supporting scheduling of radio resources for individual cells by each respective pod, of a plurality of respective pods, supporting scheduling of radio resources for a respective individual cell (i.e., instead of individual cell controller cards doing so) is a useful mechanism for creating pools of resources in the 5G network. Such pools of resources may enforce scheduling requirements and provide a utility for shifting workloads around in the 5G network during management of a cluster of cells.

Briefly described, embodiments disclosed herein are directed towards systems and methods for an adaptive DU scheduler in a wireless telecommunication network, such as a wireless 5G network. Example embodiments include systems and methods for: a central scheduler maximizing overall throughput based on received parameter values; maximizing the overall cell site throughput, an intelligence layer that has an artificial intelligence and/or machine learning (AI/ML) model that increases the performance for all the cells by sending info to central scheduler for each of the cells; an intelligence layer that has an AI/ML models for each site type based on the traffic distribution across each cell; centralized RAN pooling; a containerized DU server with master a controller pod controlling individual cell pods; and a containerized DU server with a DU common scheduler managing all the cells.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3B illustrates a logical flow diagram showing an example process for scheduling radio resources using an adaptive DU scheduler in accordance with the second example embodiment described herein.

FIG. 4B illustrates a logical flow diagram showing an example process for scheduling radio resources using an adaptive DU scheduler in accordance with the third example embodiment described herein.

FIG. 4C illustrates a logical flow diagram showing another example process for scheduling radio resources using an adaptive DU scheduler in accordance with the third example embodiment described herein.

FIG. 5B illustrates a logical flow diagram showing an example process for scheduling radio resources using an adaptive DU scheduler in accordance with the fourth example embodiment described herein.

FIG. 5C illustrates a logical flow diagram showing another example process for scheduling radio resources using an adaptive DU scheduler in accordance with the fourth example embodiment described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
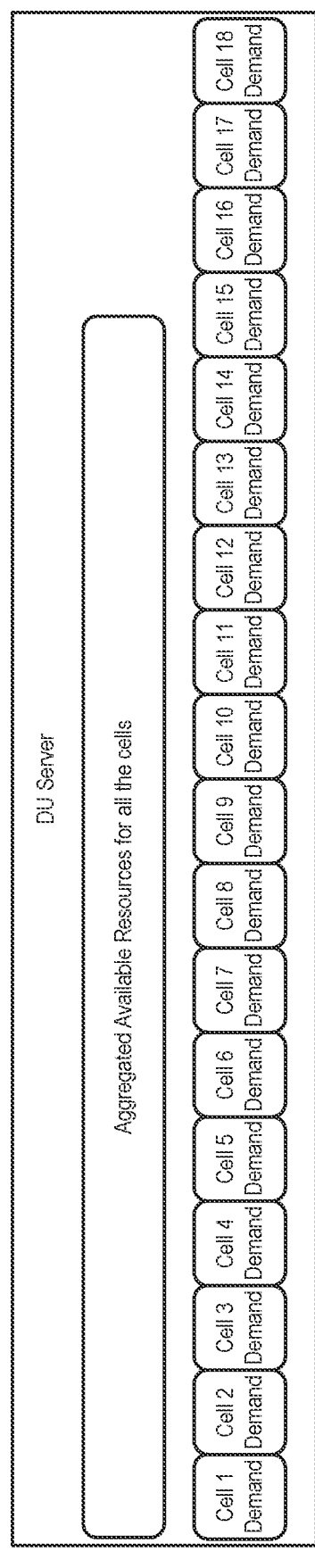
FIG. 1 illustrates an example of a traditional distributed unit (DU) server.

FIG. 1 illustrates an example of a traditional distributed unit (DU) server 100.

DU servers are designed to support multiple cells. The server dimensioning may generally be performed considering some kind of pooling and statistical traffic models. The assumption is statistically, the simultaneous demand from all cells has very low probability. Traditionally, whenever the resources from all the cells exceed the designed capacity, the DU scheduler will limit the certain cells according to a maximum supported limit of resources based on the upper bound on the maximum limit an entire DU can handle. The DU scheduler can choose to assign in the order of the received request from each cell. The DU scheduler can have some fixed set priorities for the resources for each of the cells. However, the DU scheduler traditionally does not consider maximizing the user experiences on higher channel BWs while ensuring no drops for VoNR or other high priority traffic.

Figure 2A:
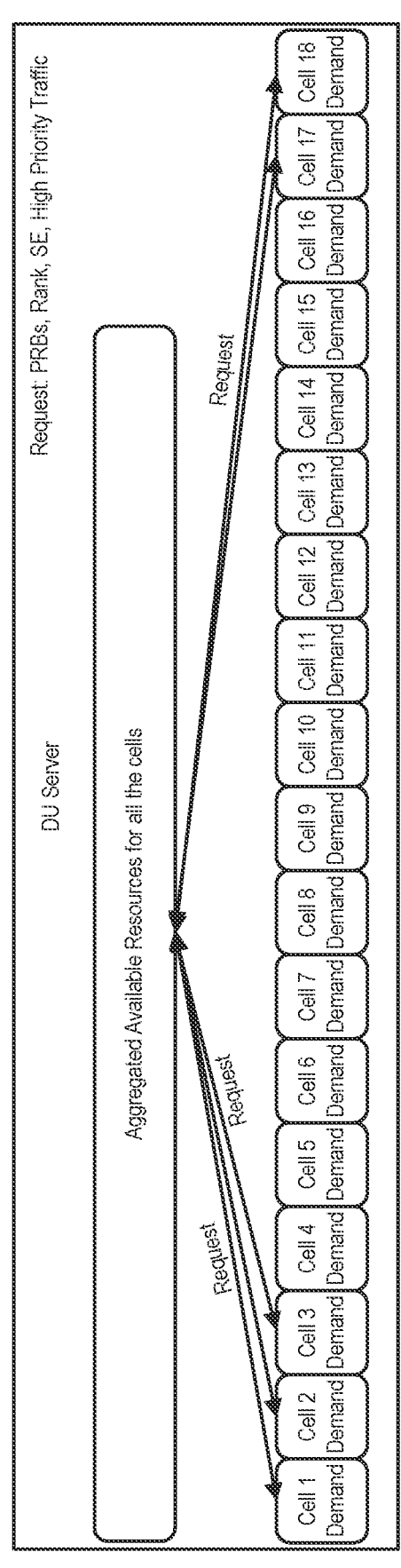
FIG. 2A illustrates an example of a (DU) server implementing an adaptive DU scheduler in accordance with a first example embodiment described herein.
Figure 2A:

FIG. 2A illustrates an example of a (DU) server 200 implementing an adaptive DU scheduler in accordance with a first example embodiment described herein.

To solve the above problem, in the present example embodiment, each of the cells may send the following parameters to the central scheduler: total required resources (e.g. physical resource blocks (PRBs)); control signaling resources; high priority traffic; required number of layers for the total PRBs; current spectral efficiency of the cell. Various other information may be sent in various other embodiments.

The central scheduler receives the information from each of the cells. The central scheduler calculates the achieved throughput for each cell by ensuring high priority traffic and control signaling resources have been allocated. the central scheduler maximizes or increases the overall cell site throughput by allocating the resources to each cells on per Transmission Time Interval (TTI) basis. The central scheduler may allocate resources for high priority traffic and control signaling resources and assign cells that provide maximum throughput.

Figure 2B:
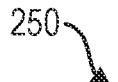
FIG. 2B illustrates a logical flow diagram showing an example process for scheduling radio resources using an adaptive DU scheduler in accordance with the first example embodiment described herein.
Figure 2B:
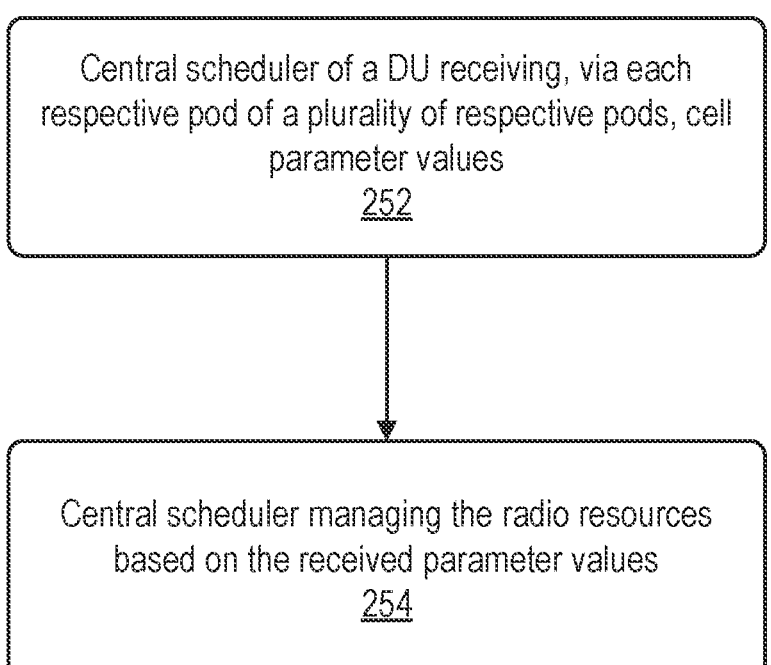

FIG. 2B illustrates a logical flow diagram 250 showing an example process for scheduling radio resources using an adaptive DU scheduler in accordance with the first example embodiment described herein.

At 252 a central scheduler of a distributed unit (DU) receives, via each respective pod of a plurality of respective pods, parameter values indicating, for each respective individual cell of the plurality of cells, one or more of: total required resources, control signaling resources, high priority traffic, required number of layers of a total of required physical resource blocks (PRBs), and current spectral efficiency of the respective individual cell.

At 254 the central scheduler manages the radio resources based on the received parameter values. The managing of radio resources based on the received parameter values may include the central scheduler, for each respective individual cell of the plurality of cells, calculating an achieved throughput by ensuring high priority traffic and control signaling resources have been allocated.

The managing of radio resources based on the received parameter values may also include increasing an overall throughput for the plurality of cells by allocating the radio resources to each respective individual cell of the plurality of cells on a per Transmission Time Interval (TTI) basis. In such instances, the increasing of the overall throughput may include allocating, for each respective individual cell of the plurality of cells, resources for high priority traffic and control signaling resources. In an example embodiment, the increasing of the overall throughput may include allocating, for each respective individual cell of the plurality of cells, resources for high priority traffic and control signaling resources.

Figure 3A:
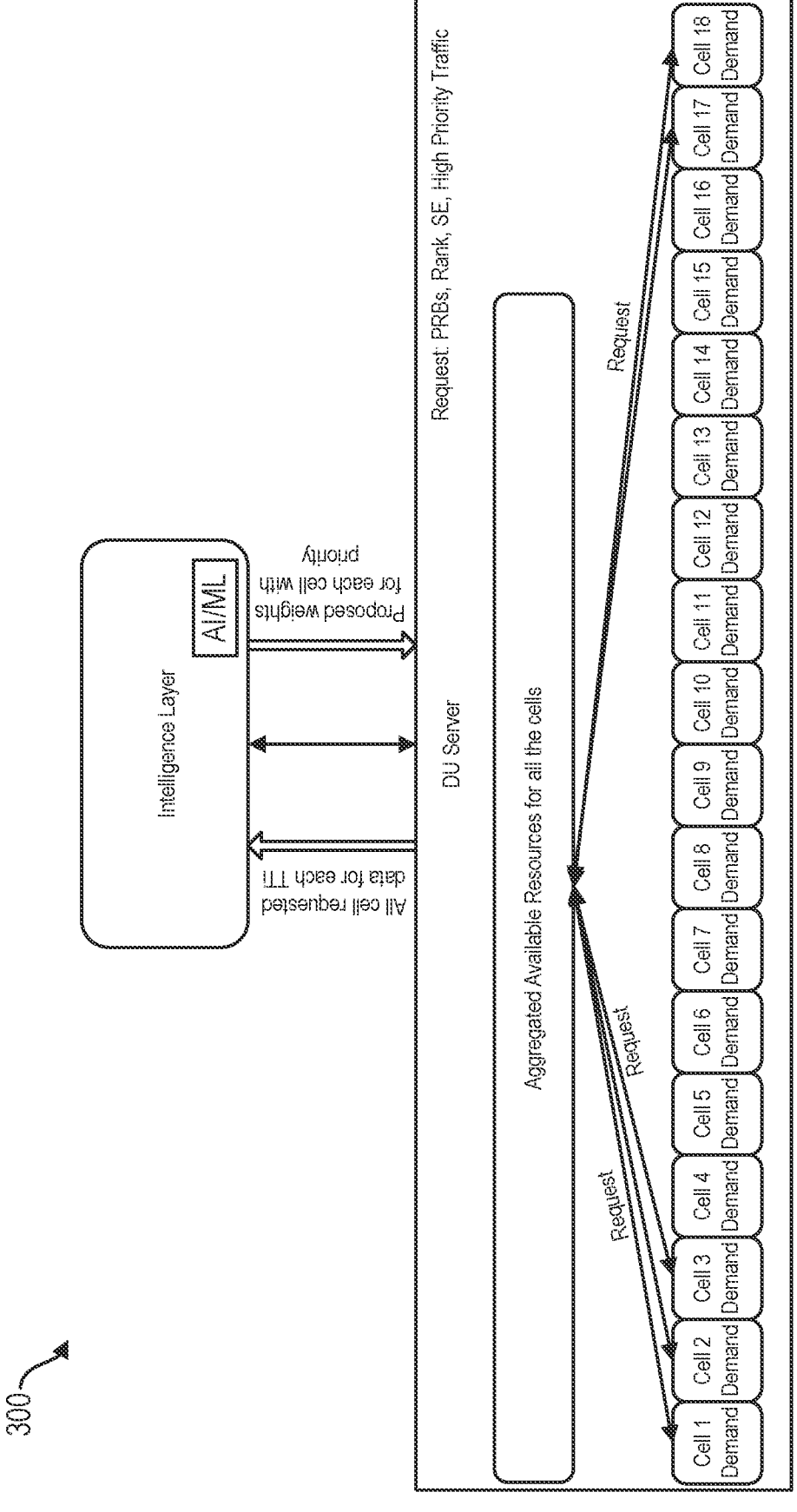
FIG. 3A illustrates an example of a (DU) server implementing an adaptive DU scheduler in accordance with a second example embodiment described herein.

FIG. 3A illustrates an example of a (DU) server 300 implementing an adaptive DU scheduler in accordance with a second example embodiment described herein.

In the present example embodiment, a DU may be connected to an intelligence layer, the intelligence layer can be a 3rd party tools such as a network orchestrator, a RAN Intelligent Controller (RIC), etc. The DU may send the values for the following parameters for each cell being managed by the DU to the intelligence layer: total required resources (e.g. PRBs); control signaling resources; high priority traffic; required number of layers for the total PRBs; and current spectral efficiency of the cell. Values for additional may be sent in various different embodiments.

The Intelligence layer may have an AI/ML model that optimizes the performance for all the cells and send the info to a central scheduler for each of the cells. AI/ML model may be able to perform prediction based on the past historical data and connection to other data sources (e.g. morphological information, site information, etc.). The AI/ML model may send the priorities to the DU scheduler periodically (as low as per TTI) for all the cells.

The DU scheduler follows the feedback from the AI/ML model for all the cells. In the present embodiment, the DU scheduler allocates resources for high priority traffic and control signaling resources. The DU scheduler assigns cells resources based on the priority received by the Intelligence layer.

FIG. 3B illustrates a logical flow diagram 350 showing an example process for scheduling radio resources using an adaptive DU scheduler in accordance with the second example embodiment described herein.

At 352, a central scheduler of a distributed unit (DU) send to an intelligence layer, for each respective individual cell of a plurality of cells the DU serves, parameter values indicating one or more of: total required resources, control signaling resources, high priority traffic, required number of layers of a total of required physical resource blocks (PRBs), and current spectral efficiency of the respective individual cell.

At 354, the central scheduler receives from the intelligence layer priorities for allocation of radio resources for each respective individual cell of a plurality of cells based on predictions, made by an artificial intelligence or machine learning model using the received parameter values, of radio resource utilization of each respective individual cell and aggregated available resources for the plurality of cells.

At 356, the central scheduler schedules radio resources based on the received priorities.

Figure 3C:
FIG. 3C illustrates a logical flow diagram showing another example process for scheduling radio resources using an adaptive DU scheduler in accordance with the second example embodiment described herein.
Figure 3C:
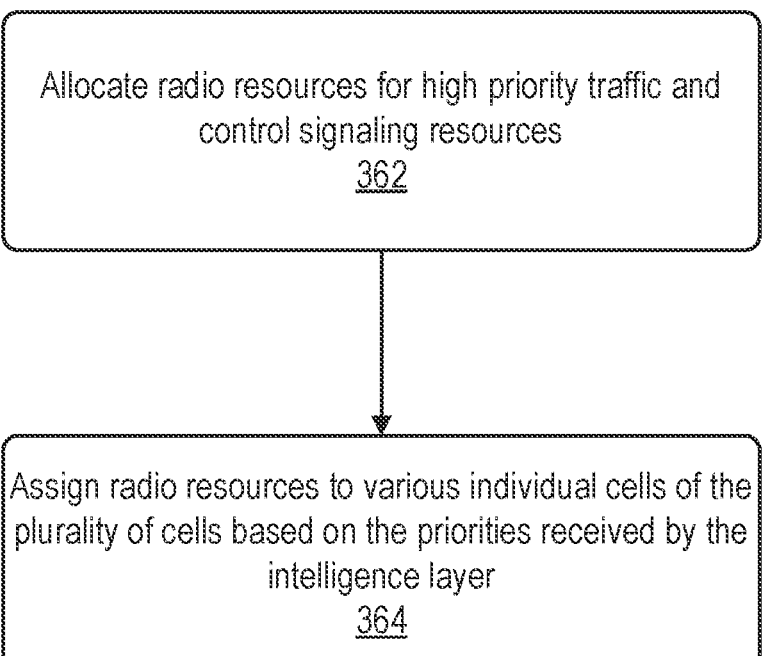

FIG. 3C illustrates a logical flow diagram showing another example process 360 for scheduling radio resources using an adaptive DU scheduler in accordance with the second example embodiment described herein.

At 362, the central scheduler allocates radio resources for high priority traffic and control signaling resources.

At 364, the central scheduler assigns radio resources to various individual cells of the plurality of cells based on the priorities received by the intelligence layer. In an example embodiment the predictions are made based on past historical data regarding the plurality of cells and connection to other data sources that include cell site morphological information or other cell site information of cell sites providing the plurality of cells. In an example embodiment, the receiving from the intelligence layer priorities for allocation of radio resources may include receiving the priorities periodically per Transmission Time Interval (TTI) for each respective individual cell of a plurality of cells.

Figure 4A:
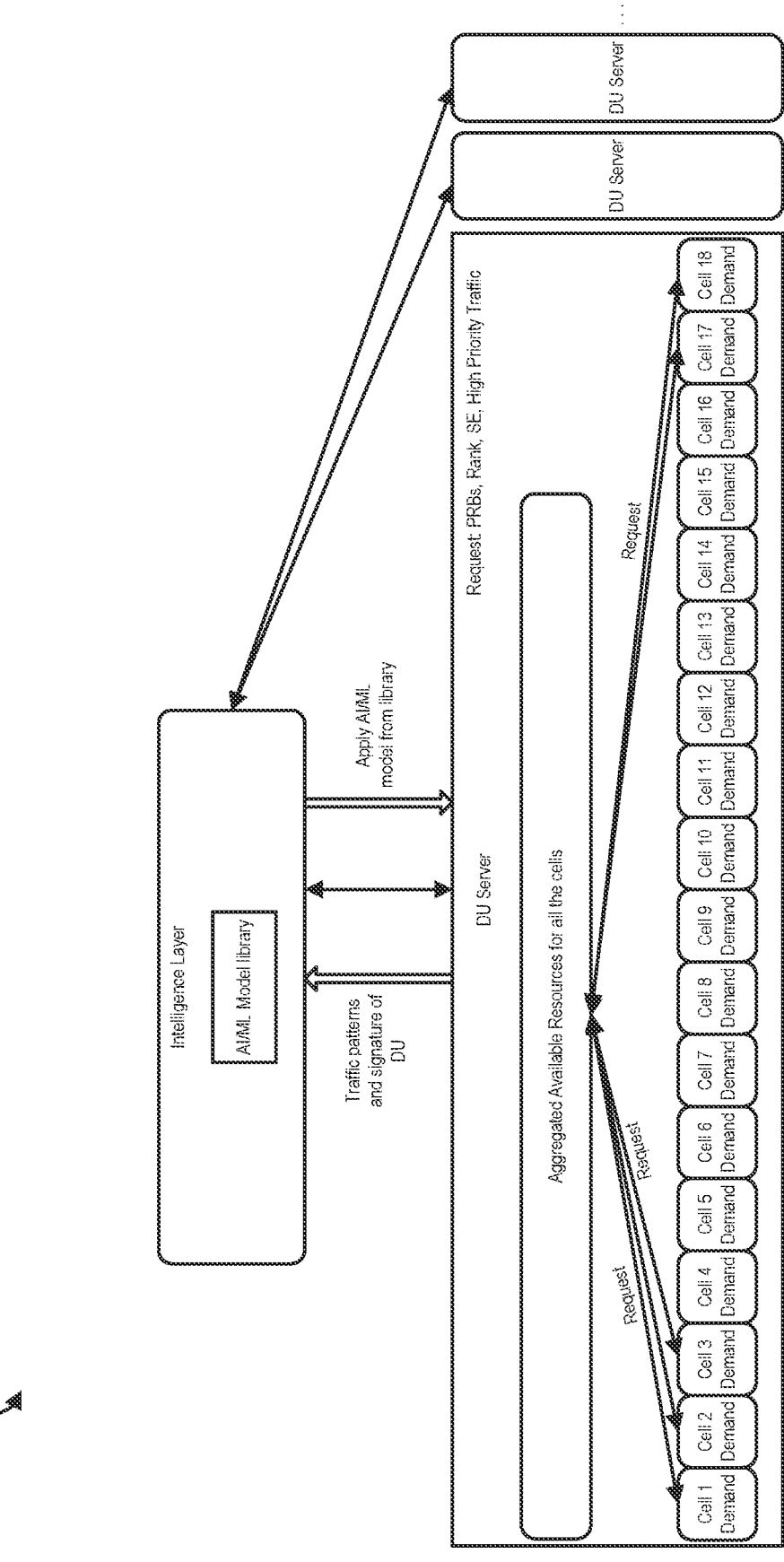
FIG. 4A illustrates an example of a (DU) server implementing an adaptive DU scheduler in accordance with a third example embodiment described herein.

FIG. 4A illustrates an example of a (DU) server 400 implementing an adaptive DU scheduler in accordance with a third example embodiment described herein.

In the present example embodiment, an intelligence layer trains and maintains a library of machine learning models for each site type based on the traffic distribution across each cell based on the following attributes as input: PRB utilization on downlink (DL) and uplink (UL); average rank assignment on downlink and uplink (i.e., based on multiple input, multiple output (MIMO)—an antenna technology for wireless communications in which multiple antennas are used at both the source (transmitter) and the destination (receiver)); Average signal to noise ratio (SINR) as per Channel Quality Indicator (CQI) reported by the user equipment devices (UEs); VoNR call distribution; and other service types managed by that DU (e.g., video, mission critical service, other high priority network slice, etc.). Some of the attributes of these models may be, but are not limited to, the following: minimum reserved/guaranteed PRBs for each of the cells to ensure no performance degradation to a specific service time (e.g., VoNR); minimum reserved PRBs to support control channels for each of the cells; maximum PRBs that could be available for a specific cell which is not managing high priority traffic; and remaining PRBs that may be available in a pool to be available for any cells with periodic feedback between the cells and the scheduler, until all the PRBs are allocated.

In an example embodiment, an intelligence layer (orchestrator, RIC, or an xAPP (i.e., a software tool used by a RAN Intelligent Controller (RIC) to manage network functions in near-real time)) manages a set of DUs may monitor the traffic pattern across different times of the day and identifies/applies a model in real time from the library based on the signature of the DU or from the historical data available for that DU.

FIG. 4B illustrates a logical flow diagram showing an example process 400 for scheduling radio resources using an adaptive DU scheduler in accordance with the third example embodiment described herein.

At 452, a central scheduler of a distributed unit (DU) sends to an intelligence layer, for each respective individual cell of a plurality of cells the DU serves, cell attributes including parameter values indicating one or more of: physical resource block (PRB) utilization on downlink and uplink, average rank assignment on downlink and uplink, average signal to noise ratio (SINR) as per Channel Quality Indicator (CQI) reported by various different user equipment devices (UEs); Voice Over New Radio (VoNR) call distribution, and other service types managed by the DU.

At 454, the central scheduler receives from the intelligence layer priorities for allocation of radio resources for each respective individual cell of a plurality of cells based on predictions of radio resource utilization of each respective individual cell of the plurality of cells. The predictions may be made by one or more artificial intelligence or machine learning models of a library artificial intelligence or machine learning models trained and maintained by the intelligence layer for each cell site type of a plurality of cell site types based on traffic distribution across each cell plurality of cells based on the received parameter values.

At 456, the central scheduler schedules radio resources based on the received priorities.

FIG. 4C illustrates a logical flow diagram showing another example process 460 for scheduling radio resources using an adaptive DU scheduler in accordance with the third example embodiment described herein.

At 462, the intelligence layer manages a set of Dus.

At 464, the intelligence layer monitors a network traffic pattern across different times of day.

At 466, the intelligence layer identifies an artificial intelligence or machine learning model from the library of artificial intelligence or machine learning models in real time based on a signature of the DU or from historical data available from the DU.

At 468, the intelligence layer applies the identified artificial intelligence or machine learning model to make the predictions of radio resource utilization of each respective individual cell of the plurality of cells. In one example embodiment, the intelligence layer may be part of the DU.

Figure 5A:
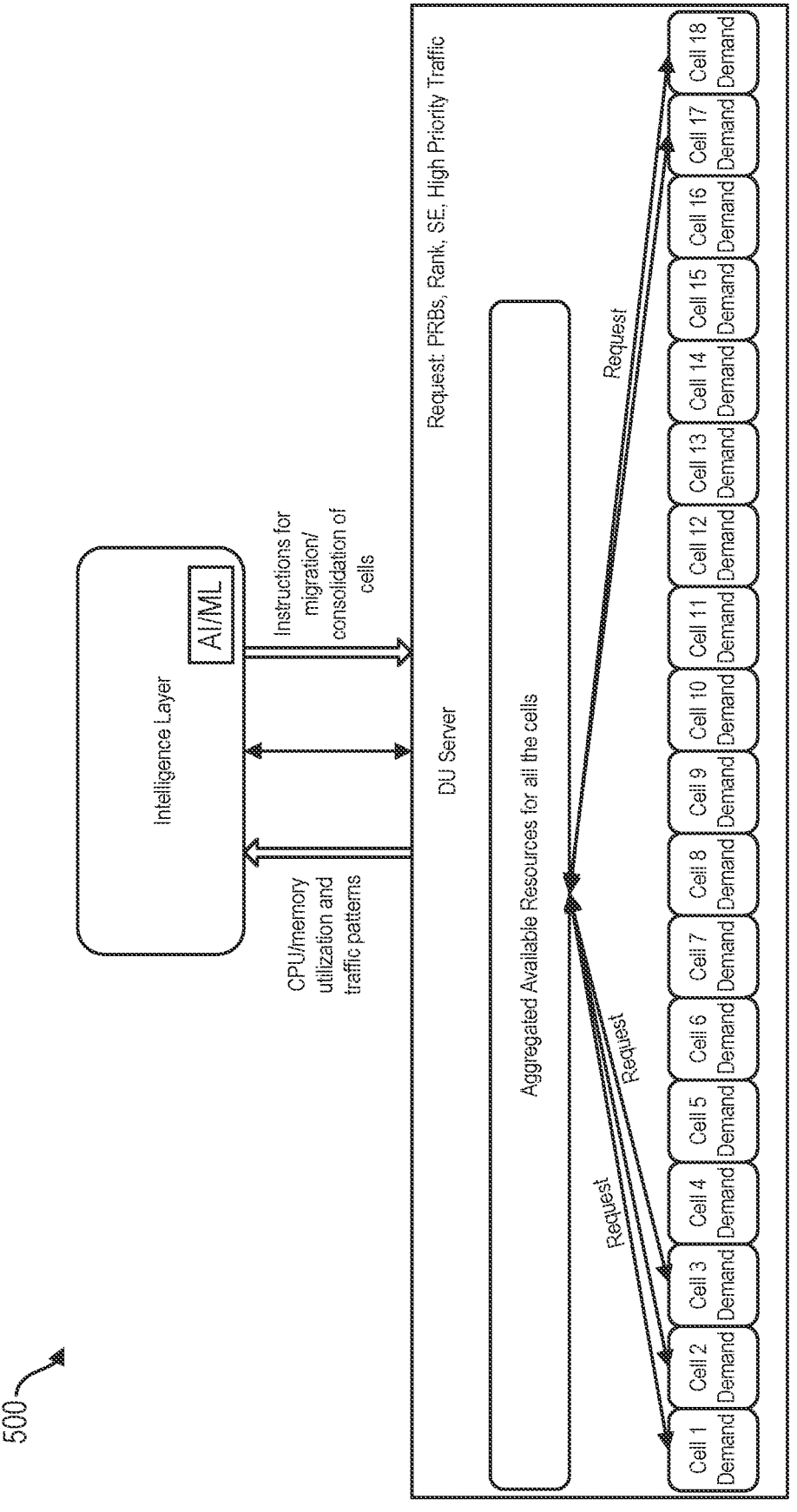
FIG. 5A illustrates an example of a (DU) server implementing an adaptive DU scheduler in accordance with a fourth example embodiment described herein.

FIG. 5A illustrates an example of a (DU) server 500 implementing an adaptive DU scheduler in accordance with a fourth example embodiment described herein.

According to the present embodiment, for better pooling of underlying compute resources, a large DU may be created with multiple pods supporting a cluster of sites across different morphologies, traffic patterns and service types. Since the layer 1 (L1) and layer 2 (L2) for a specific cell needs to run on the same central processing unit (CPU) to support low latency scheduling, a DU may have multiple pods running on different compute instances (i.e., "computes") managing a group of cells. In such cases, each cell has both L1 and L2 processes running on a single compute.

There may be an intelligence layer, RIC/and/or Xapp which receives the CPU/memory utilization numbers from the application programming interfaces (APIs) exposed by the underlying infrastructure and/or platform. If there are some compute servers which are running at higher utilization than others impacting the capacity available to the cells running on that server, the intelligence layer tries to migrate some of the cells to run on other compute servers until the CPU/memory utilization across all servers is almost the same.

This intelligence layer also monitors the traffic pattern of a site and, during off peak hours when the traffic demand is low, coverage cells may be consolidated to a small group of compute servers and capacity may be turned OFF leading to some of the compute servers being put to sleep mode to conserve power at the Central Data Center. When the traffic demand exceeds beyond a certain threshold, some of the compute servers may be brought back active enabling additional capacity cells to serve the traffic demands.

FIG. 5B illustrates a logical flow diagram showing an example process 550 for scheduling radio resources using an adaptive DU scheduler in accordance with the fourth example embodiment described herein.

At 552, a distributed unit (DU) with multiple pods supports a cluster of cell sites across different morphologies, traffic patterns and service types. The multiple pods may run on different compute instances managing a plurality of cells and each cell of the plurality of cells have both layer 1 (L1) and layer 2 (L2) processes running on a single compute instance.

At 554, an intelligence layer receives central processing unit (CPU) and memory utilization statistics of a plurality of compute servers providing the compute instances.

At 556, the intelligence layer may determine whether there are certain compute servers of the plurality of compute servers which are running at higher utilization than other compute servers of the plurality of compute servers, thus impacting a capacity available to particular cells of the plurality of cells running on the certain compute servers.

At 558, the DU migrates some of the cells to run on the other compute servers until the CPU and memory utilization across the plurality of compute servers is substantially equal.

FIG. 5C illustrates a logical flow diagram showing another example process 560 for scheduling radio resources using an adaptive DU scheduler in accordance with the fourth example embodiment described herein.

At 562, the intelligence layer monitors a network traffic pattern of a particular cell site of the plurality a cell sites during off peak hours to detect when network traffic demand is low.

At 564, the DU, based on the monitoring, in response to network traffic demand being detected to be lower than a particular threshold, migrates a cell corresponding to the particular cell site to another compute server to consolidate cells of the plurality of cells to run on a smaller group of compute servers of the plurality of compute servers.

At 566, the DU causes some of the compute servers of the plurality of compute servers to be put in sleep mode based on the migrating the cell to conserve power at a central data center.

In some embodiments, based on the monitoring, in response to network traffic demand being detected to be equal to or higher than the threshold, the DU activates some of the compute servers again to enable additional capacity cells to serve the traffic demands.

Figure 6:
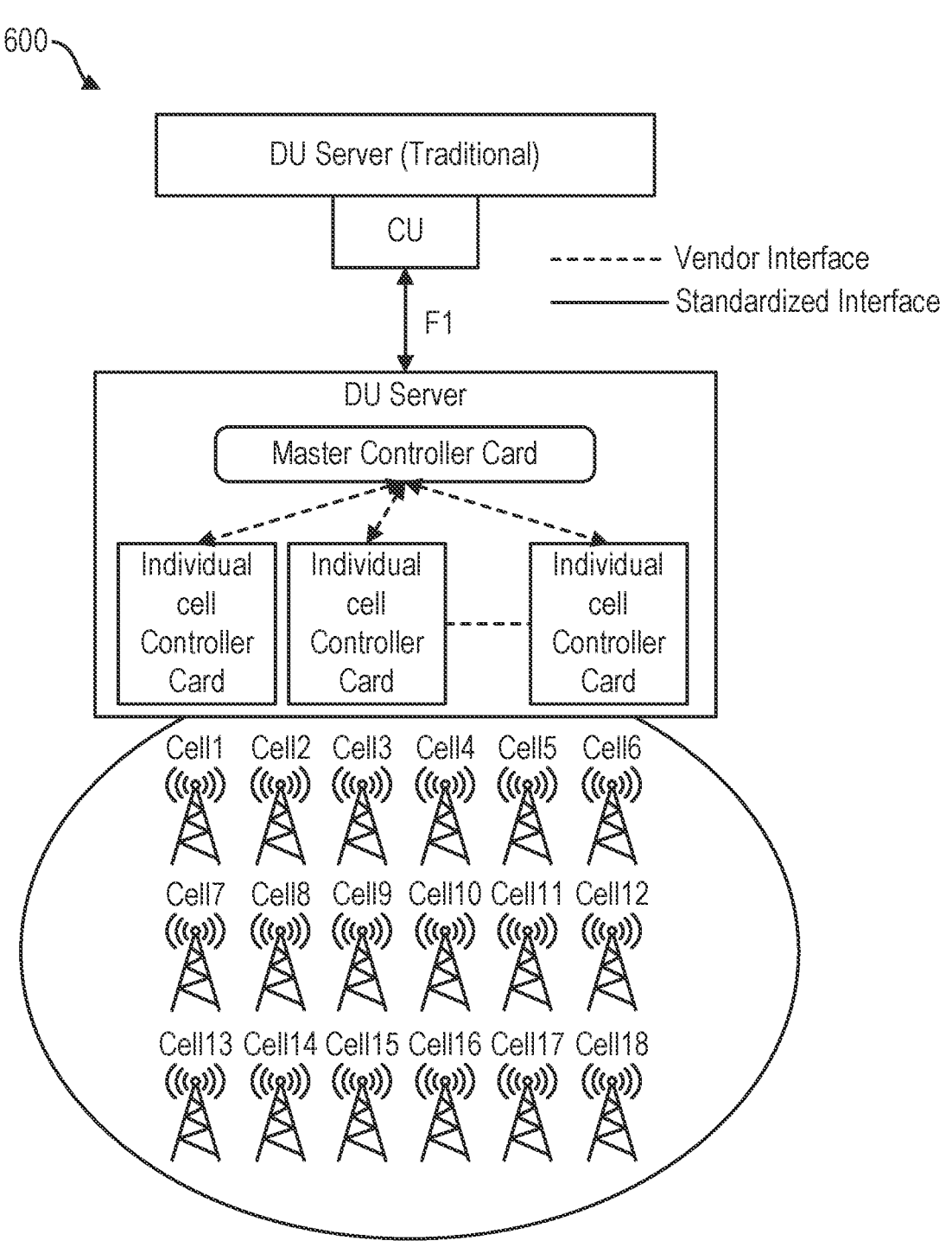
FIG. 6 illustrates an example of a traditional distributed unit (DU) server with individual cell controller cards.

FIG. 6 illustrates an example of a traditional distributed unit (DU) server with individual cell controller cards. As shown in FIG. 6, traditionally, RAN vendors provide the entire solution as a cabinet where there is a master controller card along with channel cards to support individual cells based on certain capacity.

Figure 7A:
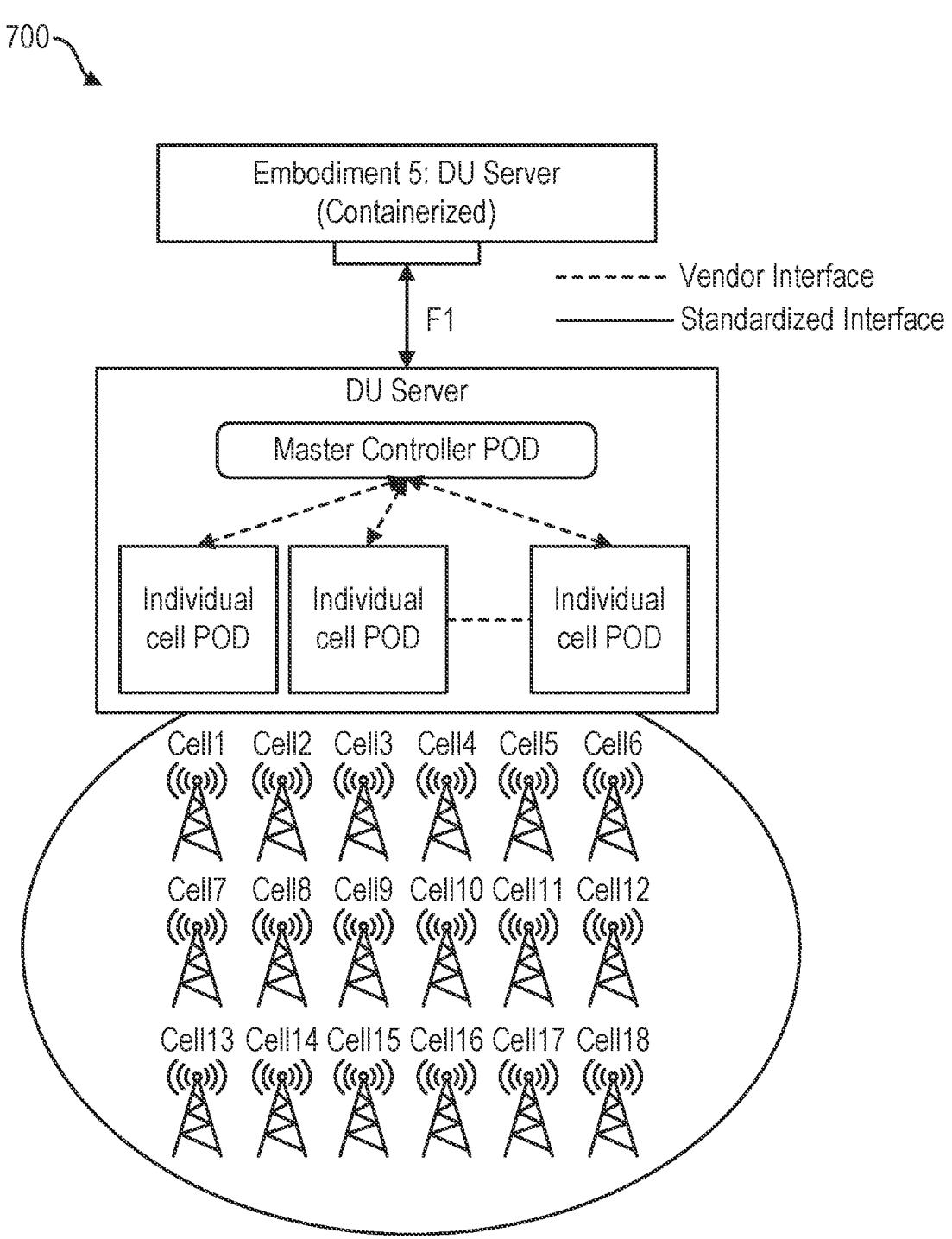
FIG. 7A illustrates an example of a (DU) server implementing an adaptive DU scheduler in accordance with a fifth example embodiment described herein.

FIG. 7A illustrates an example of a (DU) server 700 implementing an adaptive DU scheduler in accordance with a fifth example embodiment described herein. The present example embodiment includes a containerized version of the DU, which includes a DU as a pod, with a master controller pod that manages resources for all the individual PODs that is managing each of the cells.

In an example embodiment, two schedulers are at the DU level. In particular, a DU scheduler (e.g., the master controller pod) may distribute PRBs to various cells running on a compute server. A Medium Access Control (MAC) scheduler for each cell (e.g., an individual cell pod) schedules users within a slot/TTI for each cell. The MAC scheduler assigns gNb bandwidth resources to user equipment and is responsible for deciding how uplink and downlink channels are used by the gNb and the UEs of a cell. The DU scheduler also enforces the necessary Quality of Service (QOS) or UE connections. In the present example embodiment, the DU scheduler may have the real time (TTI level) visibility of the traffic demand of each cell, traffic type, number of UEs, average UE CQI distribution and the availability of compute resources.

Figure 7B:
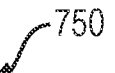
FIG. 7B illustrates a logical flow diagram showing an example process for scheduling radio resources using an adaptive DU scheduler in accordance with the fifth example embodiment described herein.
Figure 7B:
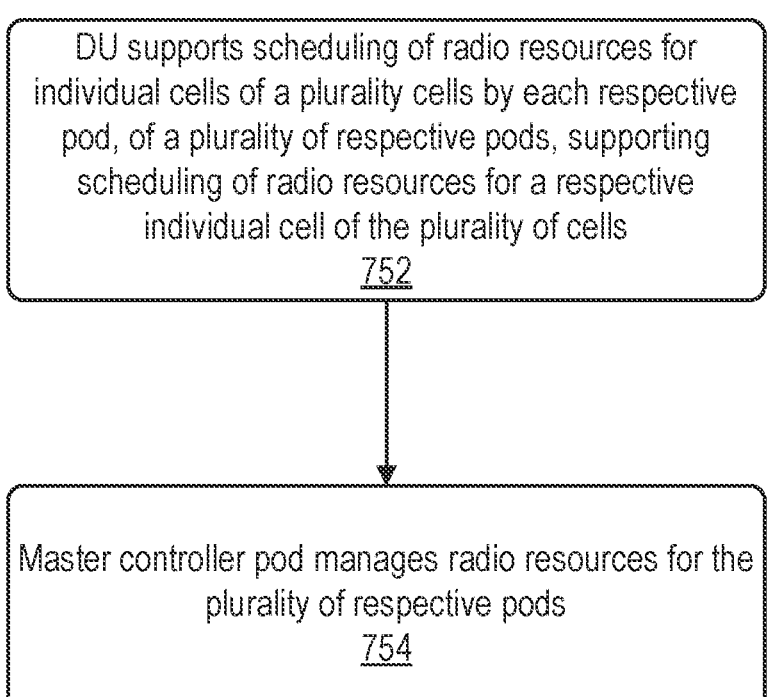

FIG. 7B illustrates a logical flow diagram showing an example process 750 for scheduling radio resources using an adaptive DU scheduler in accordance with the fifth example embodiment described herein.

At 752, a distributed unit (DU) supports scheduling of radio resources for individual cells of a plurality of fifth-generation New Radio (5G NR) cells by each respective pod, of a plurality of respective pods, that comprises part of the DU and encapsulates one or more software applications, supporting scheduling of radio resources for a respective individual cell of the plurality of cells.

At 754, a master controller pod, that comprises part of the DU and encapsulates one or more software applications, manages radio resources for the plurality of respective pods.

Figure 7C:
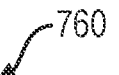
FIG. 7C illustrates a logical flow diagram showing another example process for scheduling radio resources using an adaptive DU scheduler in accordance with the fifth example embodiment described herein.
Figure 7C:
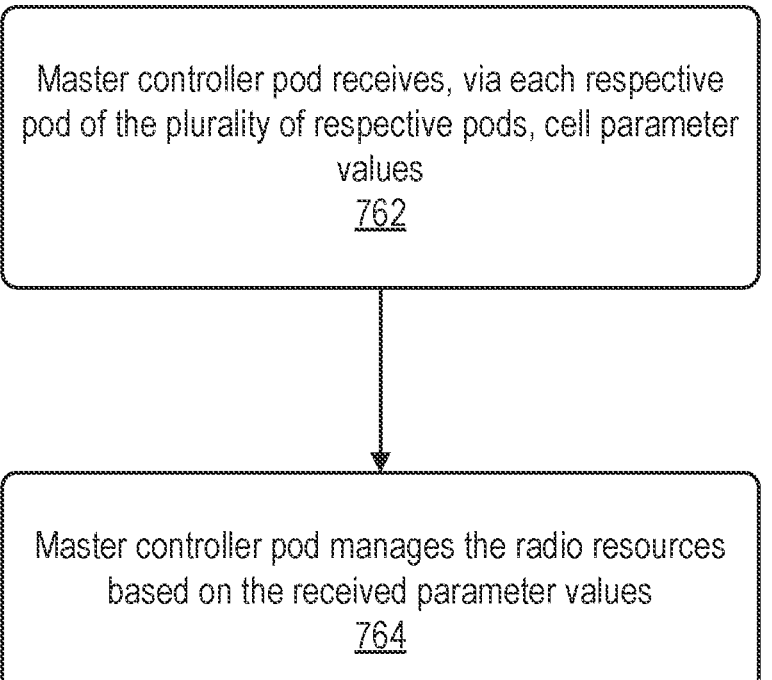

FIG. 7C illustrates a logical flow diagram showing another example process 760 for scheduling radio resources using an adaptive DU scheduler in accordance with the fifth example embodiment described herein.

At 762, the master controller pod receives, via each respective pod of the plurality of respective pods, parameter values indicating, for each respective individual cell of the plurality of cells, one or more of: total required resources, control signaling resources, high priority traffic, required number of layers of a total of required physical resource blocks (PRBs), and current spectral efficiency of the respective individual cell.

At 764, the master controller pod manages the radio resources based on the received parameter values.

The managing of radio resources based on the received parameter values may include the master controller pod, for each respective individual cell of the plurality of cells, calculating an achieved throughput by ensuring high priority traffic and control signaling resources have been allocated. In an example embodiment, the managing of radio resources based on the received parameter values may further include increasing an overall throughput for the plurality of cells by allocating the radio resources to each respective individual cell of the plurality of cells on a per Transmission Time Interval (TTI) basis. The increasing the overall throughput may include allocating, for each respective individual cell of the plurality of cells, resources for high priority traffic and control signaling resources. The increasing the overall throughput may also include assigning resources to respective individual cells of the plurality of cells that provide maximum throughout as compared to other respective individual cells of the plurality of cells. In an example embodiment, each respective pod of the plurality of pods is a group of one or more software containers, with shared storage and network resources, and a specification for how to run the containers.

In an example embodiment, the DU supporting scheduling of radio resources for individual cells may include: the master controller pod distributing physical resource blocks (PRBs) to various cells of the plurality of cells running on a compute server based on the master controller having, via each respective pod of the plurality of respective pods, visibility of: TTI level visibility of traffic demand of each cell of the plurality of cells, traffic type of each cell of the plurality of cells, a number of UEs operating in each cell of the plurality of cells, average UE Channel Quality Indicator (CQI) distribution, and availability of compute resources for each cell of the plurality of cells, wherein each respective pod of the plurality of respective pods is a Media Access Control (MAC) scheduler that schedules users within a TTI for a respective individual cell of the plurality of cells.

Figure 8A:
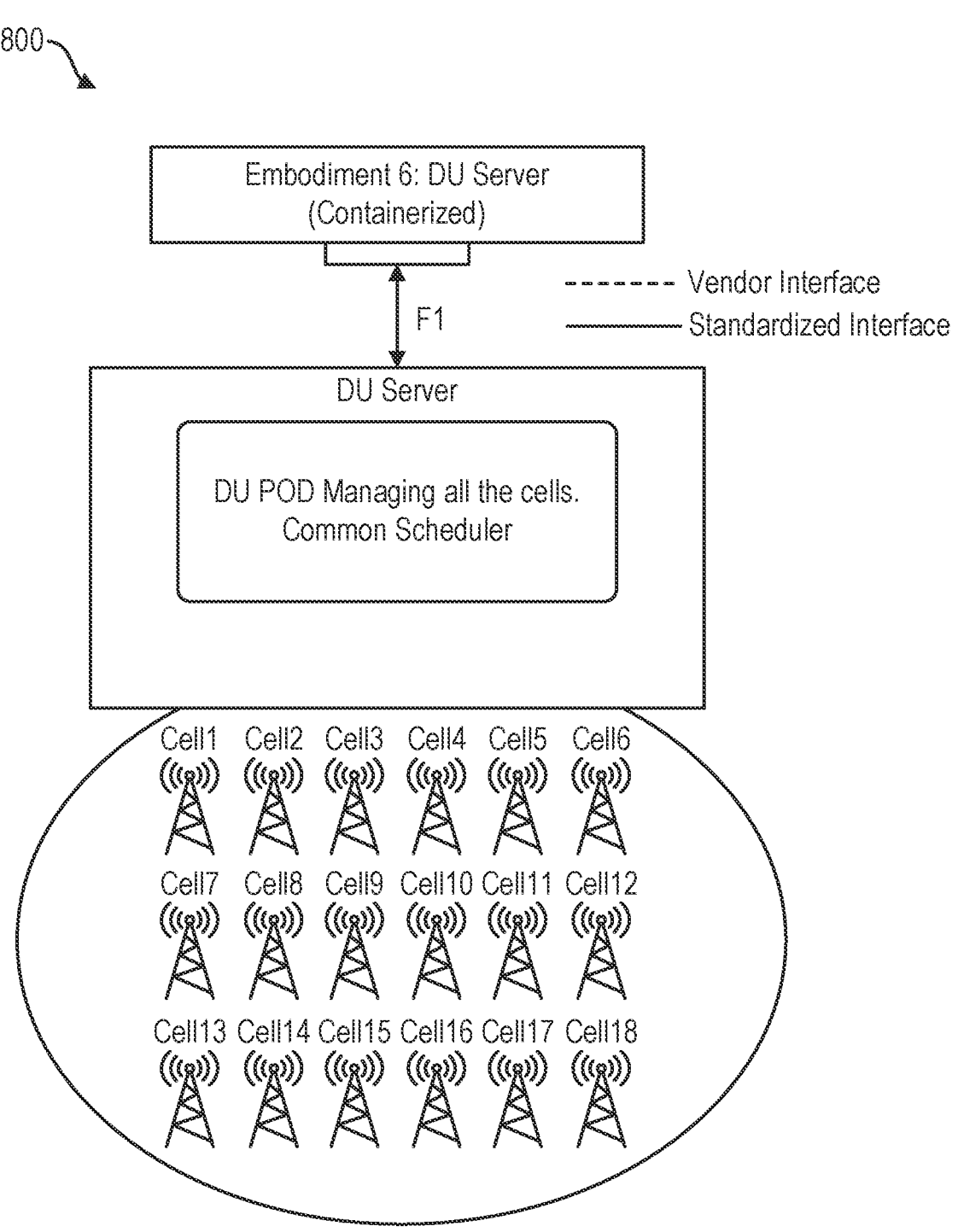
FIG. 8A illustrates an example of a (DU) server implementing an adaptive DU scheduler in accordance with a sixth example embodiment described herein.

FIG. 8A illustrates an example of a (DU) server 800 implementing an adaptive DU scheduler in accordance with a sixth example embodiment described herein. The present example embodiment includes a containerized version of a DU, which includes a common schedulers that manages resources for the entire DU and individual cells.

Figure 8B:
FIG. 8B illustrates a logical flow diagram showing an example process for scheduling radio resources using an adaptive DU scheduler in accordance with the sixth example embodiment described herein.

FIG. 8B illustrates a logical flow diagram showing an example process 850 for scheduling radio resources using an adaptive DU scheduler in accordance with the sixth example embodiment described herein.

At 852, a distributed unit (DU) pod that is a common scheduler pod manages resources for a DU. The DU pod may comprise part of the DU and may encapsulate one or more software applications.

At 854, the common scheduler pod supports scheduling of radio resources for each respective individual cell of a plurality of cells which the DU serves.

Figure 8C:
FIG. 8C illustrates a logical flow diagram showing another example process for scheduling radio resources using an adaptive DU scheduler in accordance with the sixth example embodiment described herein.
Figure 8C:
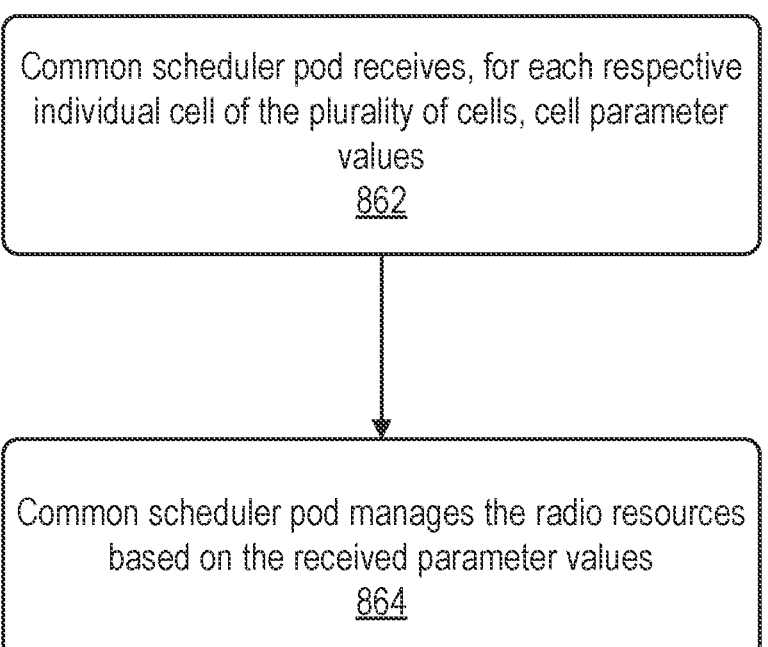

FIG. 8C illustrates a logical flow diagram showing another example process 860 for scheduling radio resources using an adaptive DU scheduler in accordance with the sixth example embodiment described herein.

At 862, the common scheduler pod receives, for each respective individual cell of the plurality of cells, one or more of: total required resources, control signaling resources, high priority traffic, required number of layers of a total of required physical resource blocks (PRBs), and current spectral efficiency of the respective individual cell.

At 864, the common scheduler pod manages the radio resources based on the received parameter values. The managing of radio resources based on the received parameter values my include the common scheduler pod, for each respective individual cell of the plurality of cells, calculating an achieved throughput by ensuring high priority traffic and control signaling resources have been allocated. The managing of the radio resources based on the received parameter values may further include increasing an overall throughput for the plurality of cells by allocating the radio resources to each respective individual cell of the plurality of cells on a per Transmission Time Interval (TTI) basis.

In an example embodiment, the increasing of the overall throughput may include allocating, for each respective individual cell of the plurality of cells, resources for high priority traffic and control signaling resource. Also, in an example embodiment, the increasing the overall throughput may include assigning resources to respective individual cells of the plurality of cells that provide maximum throughout as compared to other respective individual cells of the plurality of cells.

Figure 9:
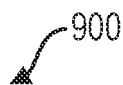
FIG. 9 shows a system diagram that describes an example implementation of a computing system(s) for implementing embodiments described herein.

FIG. 9 shows a system diagram that describes an example implementation of a computing system(s) 900 for implementing embodiments described herein.

The functionality described herein for an adaptive DU scheduler, or components thereof, can be implemented either on dedicated hardware, as a software instance running n dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 9 illustrates an example of underlying hardware on which such software and functionality may be hosted and/or implemented.

In particular, shown is example host computer system(s) 901. For example, such computer system(s) 901 may represent those in various data centers and cell sites shown and/or described herein that host the functions, components, microservices and other aspects described herein to implement an adaptive DU scheduler. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for an adaptive DU scheduler. Memory 902 may also store other programs and data 1910, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interfaces, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for scheduling radio resources, the method comprising:

a distributed unit (DU) supporting scheduling of radio resources for individual cells of a plurality of fifth-generation New Radio (5G NR) cells by each respective pod, of a plurality of respective pods, that comprises part of the DU and encapsulates one or more software applications, supporting scheduling of radio resources for a respective individual cell of the plurality of cells; and a master controller pod, that comprises part of the DU and encapsulates one or more software applications, managing radio resources for the plurality of respective pods, wherein the managing of radio resources based on the received parameter values comprises:

the master controller pod, for each respective individual cell of the plurality of cells, calculating an achieved throughput by ensuring high priority traffic and control signaling resources have been allocated.

2. The method of claim 1, wherein the managing of radio resources comprises:

the master controller pod receiving, via each respective pod of the plurality of respective pods, parameter values indicating, for each respective individual cell of the plurality of cells, one or more of: total required resources, control signaling resources, high priority traffic, required number of layers of a total of required physical resource blocks (PRBs), and current spectral efficiency of the respective individual cell; and the master controller pod managing the radio resources based on the received parameter values.

3. The method of claim 1, wherein the managing of radio resources based on the received parameter values further comprises:

increasing an overall throughput for the plurality of cells by allocating the radio resources to each respective individual cell of the plurality of cells on a per Transmission Time Interval (TTI) basis.

4. The method of claim 3, wherein the increasing the overall throughput comprises:

allocating, for each respective individual cell of the plurality of cells, resources for high priority traffic and control signaling resources.

5. The method of claim 3, wherein the increasing the overall throughput comprises:

assigning resources to respective individual cells of the plurality of cells that provide maximum throughout as compared to other respective individual cells of the plurality of cells.

6. The method of claim 1 wherein each respective pod of the plurality of pods is a group of one or more software containers, with shared storage and network resources, and a specification for how to run the containers.

7. A method for scheduling radio resources, the method comprising:

a distributed unit (DU) supporting scheduling of radio resources for individual cells of a plurality of fifth-generation New Radio (5G NR) cells by each respective pod, of a plurality of respective pods, that comprises part of the DU and encapsulates one or more software applications, supporting scheduling of radio resources for a respective individual cell of the plurality of cells; and a master controller pod, that comprises part of the DU and encapsulates one or more software applications, managing radio resources for the plurality of respective pods, wherein the DU supporting scheduling of radio resources for individual cells comprises:

the master controller pod distributing physical resource blocks (PRBs) to various cells of the plurality of cells running on a compute server based on the master controller having, via each respective pod of the plurality of respective pods, visibility of: TTI level visibility of traffic demand of each cell of the plurality of cells, traffic type of each cell of the plurality of cells, a number of UEs operating in each cell of the plurality of cells, average UE Channel Quality Indicator (CQI) distribution, and availability of compute resources for each cell of the plurality of cells, wherein each respective pod of the plurality of respective pods is a Media Access Control (MAC) scheduler that schedules users within a TTI for a respective individual cell of the plurality of cells.

8. A method for scheduling radio resources, the method comprising:

a distributed unit (DU) pod that is a common scheduler pod managing resources for a DU, wherein the DU pod comprises part of the DU and encapsulates one or more software applications; and the common scheduler pod supporting scheduling of radio resources for each respective individual cell of a plurality of cells which the DU serves, wherein the managing of radio resources comprises:

the common scheduler pod receiving, for each respective individual cell of the plurality of cells, one or more of: total required resources, control signaling resources, high priority traffic, required number of layers of a total of required physical resource blocks (PRBs), and current spectral efficiency of the respective individual cell; and the common scheduler pod managing the radio resources based on the received parameter values.

9. The method of claim 8, wherein the managing of radio resources based on the received parameter values comprises:

the common scheduler pod, for each respective individual cell of the plurality of cells, calculating an achieved throughput by ensuring high priority traffic and control signaling resources have been allocated.

10. The method of claim 9, wherein the managing of radio resources based on the received parameter values further comprises:

increasing an overall throughput for the plurality of cells by allocating the radio resources to each respective individual cell of the plurality of cells on a per Transmission Time Interval (TTI) basis.

11. The method of claim 10, wherein the increasing the overall throughput comprises:

allocating, for each respective individual cell of the plurality of cells, resources for high priority traffic and control signaling resources.

12. The method of claim 10, wherein the increasing the overall throughput comprises:

assigning resources to respective individual cells of the plurality of cells that provide maximum throughout as compared to other respective individual cells of the plurality of cells.

13. A system for scheduling radio resources, the system comprising:

at least one memory that stores computer executable instructions; and at least one processor that executes the computer executable instructions to cause actions to be performed, the actions including:

a distributed unit (DU) pod that is a common scheduler pod managing resources for a DU, wherein the DU pod comprises part of the DU and encapsulates one or more software applications; and the common scheduler pod supporting scheduling of radio resources for each respective individual cell of a plurality of cells which the DU serves, wherein the managing of radio resources comprises:

the common scheduler pod receiving, for each respective individual cell of the plurality of cells, one or more of: total required resources, control signaling resources, high priority traffic, required number of layers of a total of required physical resource blocks (PRBs), and current spectral efficiency of the respective individual cell; and the common scheduler pod managing the radio resources based on the received parameter values.

14. The system of claim 13, wherein the managing of radio resources based on the received parameter values comprises:

the common scheduler pod, for each respective individual cell of the plurality of cells, calculating an achieved throughput by ensuring high priority traffic and control signaling resources have been allocated.

15. The system of claim 14, wherein the managing of radio resources based on the received parameter values further comprises:

increasing an overall throughput for the plurality of cells by allocating the radio resources to each respective individual cell of the plurality of cells on a per Transmission Time Interval (TTI) basis.

16. The system of claim 15, wherein the increasing the overall throughput comprises:

allocating, for each respective individual cell of the plurality of cells, resources for high priority traffic and control signaling resources.

17. The system of claim 15, wherein the increasing the overall throughput comprises:

assigning resources to respective individual cells of the plurality of cells that provide maximum throughout as compared to other respective individual cells of the plurality of cells.

* * * * *